(12) United States Patent
Kanda

(10) Patent No.: US 6,822,680 B1
(45) Date of Patent: Nov. 23, 2004

(54) ONE-CHIP COLOR CAMERA THAT CAN SUPPRESS GENERATION OF PSEUDO COLOR SIGNAL WHILE MAINTAINING HIGH RESOLUTION AND METHOD OF SEPARATING COLOR DATA

(75) Inventor: Takehiko Kanda, Takatsuki (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/263,597

(22) Filed: Mar. 5, 1999

(30) Foreign Application Priority Data

Mar. 10, 1998 (JP) .......................................... 10-058394

(51) Int. Cl.$^7$ ................................................ H04N 3/14
(52) U.S. Cl. ..................... 348/273; 348/279; 358/518; 358/520; 358/525
(58) Field of Search ............................... 348/273, 279; 358/518, 525, 520

(56) References Cited

U.S. PATENT DOCUMENTS

| | | | | |
|---|---|---|---|---|
| 5,187,747 A | * | 2/1993 | Capello et al. | ............. 382/124 |
| 6,133,953 A | * | 10/2000 | Okada | ......................... 348/272 |
| 6,434,266 B1 | * | 8/2002 | Kanno et al. | ............... 345/168 |

* cited by examiner

*Primary Examiner*—Andrew Christensen
*Assistant Examiner*—Dorothy Wu
(74) *Attorney, Agent, or Firm*—Michaelson & Associates; Peter L. Michaelson

(57) ABSTRACT

A CCD is driven by a drive circuit, whereby an independent readout drive of all pixels is carried out. Data of 4 lines are input in parallel to a two-dimensional register array by 4 scanning line delay devices. Interpolation is carried out for every color signal of green, magenta, cyan and yellow by an interpolation processing circuit according to data corresponding to pixels of 4 rows and 6 columns. A color difference signal generation circuit carries out a color separation process on the basis of the color signal subjected to an interpolation process.

10 Claims, 16 Drawing Sheets

INTERPOLATION FILTER FOR Mg

INTERPOLATION FILTER FOR Mg

INTERPOLATION PROCESS FOR G

INTERPORATION PROCESS FOR Cy

INTERPOLATION PROCESS FOR Ye

HORIZONTAL DIRECTION FREQUENCY

VERTICAL DIRECTION FREQUENCY

FIG. 13

| Ye | Cy | Ye | Cy | Ye | Cy |
|----|----|----|----|----|----|
| Mg | G  | Mg | G  | Mg | G  |
| Ye | Cy | Ye | Cy | Ye | Cy |
| G  | Mg | G  | Mg | G  | Mg |

|  |  |  |  |  |  |
|---|---|---|---|---|---|
| Mg | G | Mg | G | Mg | G |
| Cy | Ye | Cy | Ye | Cy | Ye |
| Mg | G | Mg | G | Mg | G |
| Cy | Ye | Cy | Ye | Cy | Ye |
| Mg | G | Mg | G | Mg | G |
| Cy | Ye | Cy | Ye | Cy | Ye |

FIG. 19

|  |  |  |  |  |  |
|---|---|---|---|---|---|
| 1 |  | 2 |  | 1 |  |
|  |  |  |  |  |  |
| 3 |  | 6 |  | 3 |  |
|  |  |  |  |  |  |
| 1 |  | 2 |  | 1 |  |
|  |  |  |  |  |  |

ONE-CHIP COLOR CAMERA THAT CAN SUPPRESS GENERATION OF PSEUDO COLOR SIGNAL WHILE MAINTAINING HIGH RESOLUTION AND METHOD OF SEPARATING COLOR DATA

BACKGROUND OF THE INVENTION

1. Field of the Invention

The present invention relates to color cameras, and particularly to a one-chip color camera including a color separation circuit for processing a signal from a solid state image sensing device with photoelectric conversion elements arranged in an array corresponding to color filters arranged in an array.

2. Description of the Background Art

In a color camera, the CCD (Charge Coupled Device) that is currently widely used as an image sensing device simply alters the amplitude of the output signal according to the brightness of the received light. Color information is not included in the output signal. It is therefore necessary to provide some optical means to obtain color information such as filtering the light incident on the CCD.

For color cameras of personal usage, the so-called one-chip system of extracting signals of the three, primary colors from a single CCD is employed. The so-called simultaneous color image sensing system using a color filter array at the light receiving side of the CCD is adopted.

[Structure of Inter-line Transfer CCD]

FIG. 24 is a schematic block diagram showing a structure of an inter-line transfer CCD 10 that is generally used as the CCD of a color camera for domestic usage.

Inter-line transfer CCD 10 includes a photosensitive unit 12 formed of pn junction type photodiodes arranged in an array, a transfer unit 14 including an analog register formed of CCDs, and a horizontal transfer register 16 receiving the charge from CCD analog shift register (transfer unit) 14 to transfer in the horizontal direction a signal corresponding to the sequentially transferred signal charge converted into voltage for output.

In FIG. 24, the pn junction type photodiodes are shown to correspond to three pixels arranged in both the vertical and horizontal directions for the sake of simplification. In practice, photodiodes corresponding to 500 pixels in the vertical direction and 500–800 pixels in the horizontal direction, for example, are arranged in an array for the CCD employed in a color camera.

The operation will be described briefly here.

When light enters a photodiode, charge is generated to be accumulated in the diode. Then, application of a predetermined voltage on a shift gate (well known but, for simplicity, not shown) causes all the accumulated charge to be transferred to analog shift register 14. CCD analog shift register 14 responds to application of clock pulse voltages φV1, φV2 and φV3 to transfer the charge sequentially towards horizontal transfer register 16. In horizontal transfer register 16, the received signal charge is converted into voltage to be sequentially output as an image sensed signal driven by externally applied horizontal drive signals φH1, φH2 and φH3.

[Driving Method of Inter-line Transfer CCD]

As the method of driving the inter-line transfer CCD, there are generally two modes, i.e., the frame accumulation system and the field accumulation system. Some color cameras employ the frame accumulation system that is based on an entire-pixel readout operation even for the color filter array of the color difference sequential system.

In the following, an inter-line transfer CCD operating in a frame accumulation mode that can read out for every pixel is contemplated.

[Structure of Conventional One-Chip Color Camera]

FIG. 25 is a schematic block diagram showing a structure of main components of a conventional one-chip color camera 2000.

One-chip color camera 2000 mainly includes an optical system 2 receiving light from an object of interest, a CCD 10 converting an optical image formed by optical system 2 into an electric signal, a drive circuit 2102 that drives to read out independently all the pixels for CCD 10, and a color separation circuit 2101 receiving the output signal from CCD 10 to output three primary color signals R, G and B corresponding to each pixel.

Color separation circuit 2101 includes a $C_L C_R C_B$ generation circuit 2104 that receives the signal output from CCD 10 to generate a luminance signal $C_L$ and color difference signals $C_R$ and $C_B$, a random access memory 2106 (referred to as RAM hereinafter) to transfer a read out signal D (x, y), luminance signal $C_L$, and color difference signals $C_R$ and $C_B$, with $C_L C_R C_B$ generation circuit 2104, and that can retain these signals corresponding to at least one scanning line, and a matrix circuit 2108 that receives a signal from $C_L C_R C_B$ generation circuit 2104 to separate the three primary color signal RGB by a predetermined operation for output.

In one-chip color camera 2000 of FIG. 25, CCD 10 carries out a readout operation of all the pixels independently as mentioned above. More specifically, drive circuit 2102 generates a drive pulse that does not mix two pixels in the vertical direction in CCD 10.

[Method of Separating Color Difference Signal]

FIG. 26 is a schematic diagram of an arrangement of the color filter array for describing signal read out from CCD 10 including such a color filter array in a conventional one-chip color camera.

In the color difference sequential system shown in FIG. 26, color filters of magenta (represented as Mg hereinafter), green (represented as G hereinafter), cyan (represented as Cy hereinafter) and yellow (represented as Ye hereinafter) are arranged in a mosaic manner.

Since the so-called additive color process is applicable in the mixture of the color of light, the following relationship between the three primary colors of red (R), green (G) and blue (B) and the complementary colors of Mg, Ye and Cy is established.

$$Mg = R + G \quad (1)$$

$$Ye = R + G \quad (2)$$

$$Cy = B + G \quad (3)$$

By using the above Mg, G, Ye and Cy as the colors of the color filters, the intensity of the G signal having a great weight for the luminance signal out of the three primary colors of R, G and B can be set greater than that of the R and B signals.

[Generation of Pseudo Color signal]

As shown in FIG. 26, color filters Mg and G are arranged alternately in the horizontal direction (x direction) as to the 0-th line in the 0-th order in the vertical direction (y direction). Correspondingly, the signals of Mg and G are output alternately from CCD 10 as to the scanning line corresponding to this line. As to the next first line (corresponding to y=1), signals of Ye and Cy are output alternately.

Thus, the following relationship is established between each pixel (x, y) and the filter color in the CCD output signal when n is a natural number.

i) When y=4n−3 or 4n−1 (i.e., y=1, 3, 5 . . . ):
When x is an even number, the color filter is Ye.
When x is an odd number, the color filter is Cy.
ii) When y=4n−4 (i.e., y=0, 4, 8, . . . ):
When x is an even number, the color filter is Mg.
When x is an odd number, the color filter is G.
iii) When y=4n−2 (i.e., y=2, 6, 10, . . . ):
When x is an even number, the color filter is G.
When x is an odd number, the color filter is Mg.

For the purpose of convenience, the row corresponding to the color filters of Mg and G is an even numbered line, and the row corresponding to the color filters of Ye and Cy is an odd numbered line. However, the same applies for a color filter arrangement shifted by one line, for example, as will be apparent from the following description.

[Generation of Color Difference Signal from Four Pixels Fixed with Respect to Pixel (x, y)]

As mentioned above, signals are read out independently for all the pixels from CCD 10. These signals are retained in RAM 2106.

Therefore, a luminance signal $C_L$ (x, y), a first color difference signal $C_R$ (x, y) and a second color difference signal $C_B$ (x, y) for each pixel (x, y) can be generated by the following operation respectively.

In the following, the signal output from the photoelectric conversion element corresponding to a pixel (x, y) in CCD 10 is represented as D (x, y).

By the linear operation on the output signals from pixels (x, y), (x+1, y), (x, y+1), and (x+1, y+1) of two rows and two columns including pixel (x, y), a luminance signal and two color difference signals can be extracted.

In other words, the following representation is generally established.

$$Cc(x, y) = Kc(x, y) \cdot D(x, y) + Kc(x+1, y) \cdot D(x+1, y) + Kc(x, y+1) \cdot D(x, y+1) + Kc(x+1, y+1) \cdot D(x+1, y+1) \quad (4)$$

(Here, c is any of L, R and B)

It is assumed that the following relationship is established between the color of the filter of pixel (X, Y) and coefficients $K_L$ (X, Y), $K_R$ (X, Y), $K_B$ (X, Y) to generate $C_L C_R C_B$ signals. Here, X=x, x+1, Y=y, y+1.

i) When the color filter of pixel (X, Y) is Cy:

$$K_L(X, Y)=1, K_R(X, Y)=-1, K_B(X, Y)=1$$

ii) When the color filter of pixel (X, Y) is Ye:

$$K_L(X, Y)=1, K_R(X, Y)=1, K_B(X, Y)=-1$$

iii) When the color filter of pixel (X, Y) is Mg:

$$K_L(X, Y)=1, K_R(X, Y)=1, K_B(X, Y)=1$$

iv) When the color filter of pixel (X, Y) is G:

$$K_L(X, Y)=1, K_R(X, Y)=-1, K_B(X, Y)=-1$$

The generation process of a luminance signal and a color difference signal will be described more specifically hereinafter according to the relationship between the color of the filter and coefficients $K_L$, $K_R$ and $K_B$.

For example, a luminance signal and a color difference signal corresponding to pixel (0, 0) are obtained in FIG. 26.

Noting that equations (1)–(3) are established, luminance signal $C_L$ (0, 0) is represented by the following equation (5).

$$\begin{aligned} C_L(0, 0) &= D(0, 0) + D(1, 0) + D(0, 1) + D(1, 1) \\ &= Mg + G + Ye + Cy \\ &= (R+B) + G + (R+G) + (B+G) \\ &= 2R + 3G + 2B \end{aligned} \quad (5)$$

The first color difference signal $C_R$ (0, 0) is calculated from the following equation (6).

$$\begin{aligned} C_R(0, 0) &= D(0, 0) + D(0, 1) - D(1, 0) - D(1, 1) \\ &= Mg + Ye - G - Cy \\ &= (R+B) + (R+G) - G - (B+G) \\ &= 2R - G \end{aligned} \quad (6)$$

The second color difference signal $C_B$ (0, 0) is calculated by the following equation (7).

$$\begin{aligned} C_B(0, 0) &= D(0, 0) + D(1, 1) - D(0, 1) - D(1, 0) \\ &= Mg + Cy - Ye - G \\ &= (R+B) + (B+G) - (R+G) - G \\ &= 2B - G \end{aligned} \quad (7)$$

In other words, the luminance signal and the two color difference signals for pixel (0, 0) can be calculated using the output signals from pixels (0, 0), (1, 0), (0, 1), (1, 1).

The above example shows the case where pixel (0, 0) of interest corresponds to a color filter of magenta. As for a pixel of interest corresponding to a filter of another color, the luminance signal and the color difference signals can be obtained by a linear operation of the output signals from pixels (x, y), (x+1, y), (x, y+1), (x+1, y+1) of two rows and two columns including the relevant pixel (x, y).

[Problem in Generation of Color Difference Signal from Four Fixed Pixels]

The above color separation system imposes problems set forth in the following.

i) When luminance is modified in horizontal direction

Consider the case where there is a change H1 (an edge where the luminance level changes from left to right in the screen) of the luminance level in the horizontal direction as to the intensity of light incident on the CCD pixel array, as shown in FIG. 26.

For the sake of simplification, it is assumed that a light signal of achromatic color, that has no color component, is entered at the edge portion, and only the luminance level changes.

At this edge portion, the luminance level is modified by b/a (b>a) in the horizontal direction (x axis).

Calculation of a luminance signal and color difference signals for pixel (0, 0), for example, is set forth in the following.

For luminance signal $C_L$ (0, 0):

$$\begin{aligned} C_L(0, 0) &= D(0, 0) + D(1, 0) + D(0, 1) + D(1, 1) \\ &= a \times Mg + b \times G + a \times Ye + b \times Cy \\ &= a \times (R + B + R + G) + b \times (2G + B) \end{aligned} \quad (8)$$

For first color difference signal $C_R$ (0, 0):

$$C_R(0, 0) = D(0, 0) + D(0, 1) - D(1, 0) - D(1, 1) \quad (9)$$
$$= a \times Mg + a \times Ye - b \times G - b \times Cy$$
$$= a \times (R + B + R + G) - b \times (2G + B)$$

For second color difference signal $C_B$ (0, 0):

$$C_B(0, 0) = D(0, 0) + D(1, 1) - D(0, 1) - D(1, 0) \quad (10)$$
$$= a \times Mg + b \times Cy - a \times Ye - b \times G$$
$$= a \times (R + B - R - G) + b \times B$$

Since it is assumed that there is no color component, the following two equations are established.

$2R-G=0$ $2B-G=0$

With $2R=2B=G=2S$ and $R=S$, $B=S$, $G=2S$ inserted in the above equations (8)–(10), the following results are obtained for the first and second color difference signals.

$$C_R(0, 0)=-5S(b-a) \quad (11)$$

$$C_B(0, 0)=S(b-a) \quad (12)$$

Therefore, a color difference signal will be generated for pixel (0, 0) that originally does not include a color component. As a result, pseudo color appears on the screen to become the cause of degrading the picture quality.

Similarly, when there is a change H2 in the luminance level in the horizontal direction shown in FIG. 2, the following is obtained by calculating the color difference signals for a pixel (1, 0).

$$C_R(1, 0)=5S(b-a) \quad (13)$$

$$C_B(1, 0)=-S(b-a) \quad (14)$$

Therefore, pseudo color is generated for pixel (1, 0) when there is a change H2 in the luminance level.

The same applies for all the pixels having an edge in the luminance level in the horizontal direction.

ii) When luminance changes in the vertical direction

When there is a change $V_1$ in luminance in the vertical direction as shown in FIG. 26, calculation of the color difference signals for a pixel (0, 2) is set forth in the following.

For color difference signal $C_R$ (0, 2):

$$C_R(0, 2) = D(1, 2) + D(0, 3) - D(0, 2) - D(1, 3) \quad (15)$$
$$= b \times Mg + a \times Ye - b \times G - a \times Cy$$
$$= a \times (R + G - G - B) + b \times (R + B - G)$$

For color difference signal $C_B$ (0, 2):

$$C_B(0, 2) = D(1, 2) + D(1, 3) - D(0, 2) - D(0, 3) \quad (16)$$
$$= b \times Mg + a \times Cy - b \times G - a \times Ye$$
$$= a \times (G + B - R - G) + b \times (R + B - G)$$

By $2R=2B=G=2S$, $C_R(0, 2)=0$ and $C_B(0, 2)=0$ are obtained, similarly.

It is therefore appreciated that no pseudo color is generated in the vertical direction.

Similarly, when there is a change $V_2$ in the luminance signal in the vertical direction shown in FIG. 26, the values of the color difference signals both become 0 for the pixel at that edge portion. It is appreciated that a pseudo color is not generated for an edge in the vertical direction.

In the method of calculating a color difference signal according to output signals of pixels (x, y), (x+1, y), (x, y+1), (x+1, y+1) of two rows and two column including a pixel (x, y), a pseudo color is generated when there is a significant change (edge) in luminance in the horizontal direction. A pseudo color will appear at an area that originally has no color when an image is reproduced on the screen. As a result, the picture quality will be degraded.

Furthermore, in the process of generating signals R, G and B of the three primary colors from signals $C_L$, $C_R$, and $C_B$, a pseudo luminance signal will be generated by the pseudo color signal component to cause degradation in the luminance signal.

SUMMARY OF THE INVENTION

An object of the present invention is to provide a one-chip color camera that can reproduce a luminance signal and a color difference signal at high resolution without degrading the resolution for a valid number of pixels.

Another object of the present invention is to provide a color separation method that allows generation of a corresponding luminance signal and corresponding color difference signals for each pixel according to output signals read out independently from the entire pixels of the CCD while suppressing generation of a pseudo color signal.

According to an aspect of the present invention, a one-chip digital color camera includes a solid state image sensing circuit and a color separation circuit.

The solid state image sensing circuit has a photoelectric conversion element corresponding to each pixel arranged in an array.

The solid state image sensing circuit includes a color filter array in which a color filter for a corresponding photoelectric conversion element are arranged in a mosaic manner.

The color filter array includes color filters of green and first, second and third complementary colors, respectively arranged corresponding to a group of pixels of arbitrary (2×m) rows and (2×n) columns (m, n: natural number) in the solid state image sensing circuit.

The color separation circuit generates color data corresponding to the center position of the pixels in the (2×m) rows and (2×n) columns according to the output from the solid state image sensing circuit. The color separation circuit includes a color interpolation circuit and a separation operation circuit.

The color interpolation circuit functions as a low-pass filter for an output from a photoelectric conversion element arranged with a corresponding color filter out of the outputs from a plurality of photoelectric conversion elements corresponding to the pixels of (2×m) rows and (2×n) columns in at least one of the column direction and the row direction for each of green color and first, second and third complementary colors. The separation operation circuit receives the output from the color interpolation circuit to separate the color data corresponding to the center position.

According to another aspect of the present invention, a method is provided of isolating color data according to a signal read out from a solid state image sensing device. The solid state image sensing device includes a color filter array of m first rows and m second rows arranged alternately for each one row. Each first row includes a green color filter and a first complementary color filter arranged alternately. Each second row includes a second complementary color filter and a third complementary color filter arranged alternately. The method of separating color data includes the step of carrying out a process as a low-pass filter for an output from a photoelectric conversion element arranged with a corresponding color filter out of the outputs from a plurality of photoelectric conversion elements corresponding to the pixels of (2×m) rows and (2×n) columns in at least one of the column direction and the row direction for each color of green and the first, second and third complementary colors, and the step of receiving a signal processed by the low-pass filter to separate color data corresponding to the center position of the photoelectric conversion elements of (2×m) rows and (2×n) columns.

The main advantage of the present invention is that generation of a pseudo color signal can be suppressed even when there is an edge of a sudden change in the luminance level by a change in the brightness of an object of interest, while maintaining high resolution for a luminance signal. Therefore, an image of high quality with no degradation in the picture can be reproduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 schematically shows an arrangement of the color filter array of a second embodiment.

FIGS. 14, 15, 16 and 17 show the arrangement of weighting coefficients in an interpolation process for the arrangement of a magenta color filter, a green color filter, a cyan color filter, and a yellow color filter, respectively, of FIG. 13.

FIG. 18 schematically shows an arrangement of a color filter array according to a third embodiment of the present invention.

FIGS. 19, 20, 21 and 22 show an arrangement of weighting coefficients in an interpolation process for an arrangement of a magenta color filter, a green color filter, a cyan color filter, and a yellow color filter, respectively, of FIG. 18.

DESCRIPTION OF THE PREFERRED EMBODIMENTS

First Embodiment

Figure 1:
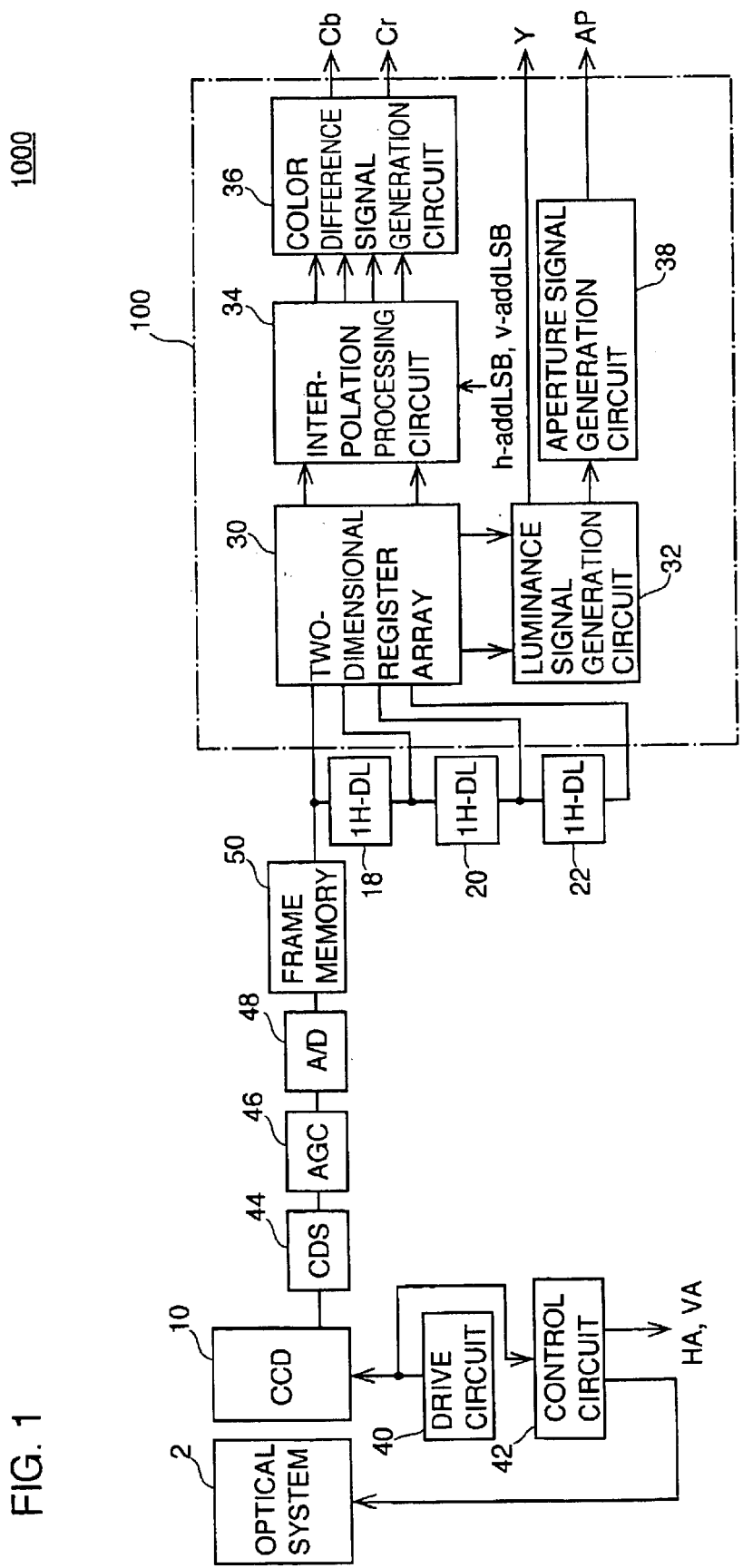
FIG. 1 is a schematic block diagram showing a structure of a color signal processing system 1000 according to a first embodiment of the present invention.

FIG. 1 is a schematic block diagram showing a structure of a color signal processing system 1000 of a one-chip color camera of the present invention.

Color signal processing system 1000 includes an optical system 2 receiving light from an object of interest, a CCD 10 converting the optical image formed by optical system 2 into electric signals, a drive circuit 40 to drive an operation of reading out entire pixels independently for CCD 10, a correlation dual sampling circuit (referred to as CDS circuit hereinafter) 44 receiving an output signal of CCD 10 to remove noise from the image sensed signal by a well-known method, an auto gain control circuit (referred to as AGC circuit hereinafter) 46 amplifying the output of CDS circuit 44, an A/D conversion circuit 48 converting the output of AGC circuit 46 into a digital signal, a frame memory 50 retaining in an alternate manner output signals of an even numbered line and an odd numbered line of CCD 10 from A/D conversion circuit 48, and a control circuit 42 receiving a CCD drive signal from drive circuit 40 to output a horizontal address HA and a vertical address VA of a pixel from which an output signal is read out.

Color signal processing system 1000 further includes a scanning line delay device 18 for delaying a first input signal from frame memory 50 for one scanning line time to output a second input signal, a scanning line delay device 20 delaying the second input signal for one scanning line time to output a third input signal, a scanning line delay device 22 delaying the third input signal for just one scanning line time to output a fourth input signal, and a color separation circuit 100 which is a two-dimensional noncirculating type digital filter receiving the first to fourth input signals to output a luminance signal Y, a first color difference signal Cb, and a second color difference signal Cr and an aperture signal AP.

Color separation circuit 100 includes a two-dimensional register array 30 sequentially receiving first to fourth input signals in parallel to retain the data (including color signals of green, yellow, cyan and magenta corresponding to the arrangement of the color filters of the CCD from which a signal is read out at the current point) from pixels of 4 rows and 5 columns, an interpolation processing circuit 34 receiving, the signal from two-dimensional register array 30 and carrying out a weighted mean process for each color signal of green, yellow, cyan and magenta to generate a color signal by interpolation corresponding to the center position of pixels in four rows and six columns, a color difference signal generation circuit 36 generating color difference signals Cb and Cr from the color signal generated by interpolation, a luminance signal generation circuit 32 receiving the signal from two-dimensional register array 30 to generate a luminance signal Y, and an aperture signal generation circuit 38 receiving luminance signal Y to output an aperture signal AP.

The image sensing lens of optical system 2 generally includes the variable mechanism of stopping down, focusing, and zooming.

Color signal processing system 1000 further includes an aperture correction circuit (not shown) that corrects the aperture (contour enhancement process) according to the aperture signal.

According to the above structure, the four types of input signals of the first to fourth input signals correspond to image sensed signals of 4 scanning lines (4 lines). These signals are input to color separation circuit 100 as a group of 4 lines.

An FIR (Finite Impulse Response) filter is realized by color separation circuit 100 and three scanning line delay devices 18–22.

[Interpolation and Color Separation]

FIGS. 2–6 are diagrams for describing an interpolation process according to the color filter array of the first embodiment.

In the specification of the filter array arrangement, it is assumed that the direction in which data is sequentially read out from CCD 10 is the y direction. The x direction is perpendicular to the y direction.

By an interpolation process of weighted mean set forth in the following, a magenta color signal component, a green color signal component, a cyan color signal component and a yellow color signal component corresponding to the center position of pixels in 4 rows and 6 columns are generated.

$$Mg = 3 \times Mg10 + Mg30 + 6 \times Mg12 + 2 \times Mg32 + 3 \times Mg14 + Mg34 \quad (17)$$

$$G = 3 \times G11 + G31 + 6 \times G13 + 2 \times G33 + 3 \times G15 + G35 \quad (18)$$

$$Cy = Cy00 + 3 \times Cy20 + 2 \times Cy02 + 6 \times Cy22 + Cy04 + 3 \times Cy24 \quad (19)$$

$$Ye = Ye01 + 3 \times Ye21 + 2 \times Ye03 + 6 \times Ye23 + Ye05 + 3 \times Ye25 \quad (20)$$

There are four arrangements of the color filters corresponding to the pixels of 4 rows and 6 columns. More specifically, the arrangement shown in FIG. 2, the arrangement which is a shifted version of the arrangement of FIG. 2 by just one row, an arrangement which is a shifted version of FIG. 2 by just one column in the column direction, and the arrangement which is a shifted version of FIG. 2 by one row and one column in the row and column directions. An arrangement other than that of FIG. 2 has the arrangement of the weighting coefficients of the weighted mean for each color filter corresponding to the other respective arrangements in FIGS. 3–6.

In the first embodiment, CCD 10 carries out an operation of reading out all pixels independently. More specifically, as to the 0-th line of 0-th order in the vertical direction (x direction) corresponding to the alternate arrangement of color filters Ye and Cy in the horizontal direction (y direction), the signal read out from CCD 10 is an output of Ye and Cy alternately for the scanning line corresponding to the 0-th line. As to the next first line (corresponding to x=1), signals Mg and G are output alternately.

Figure 7:
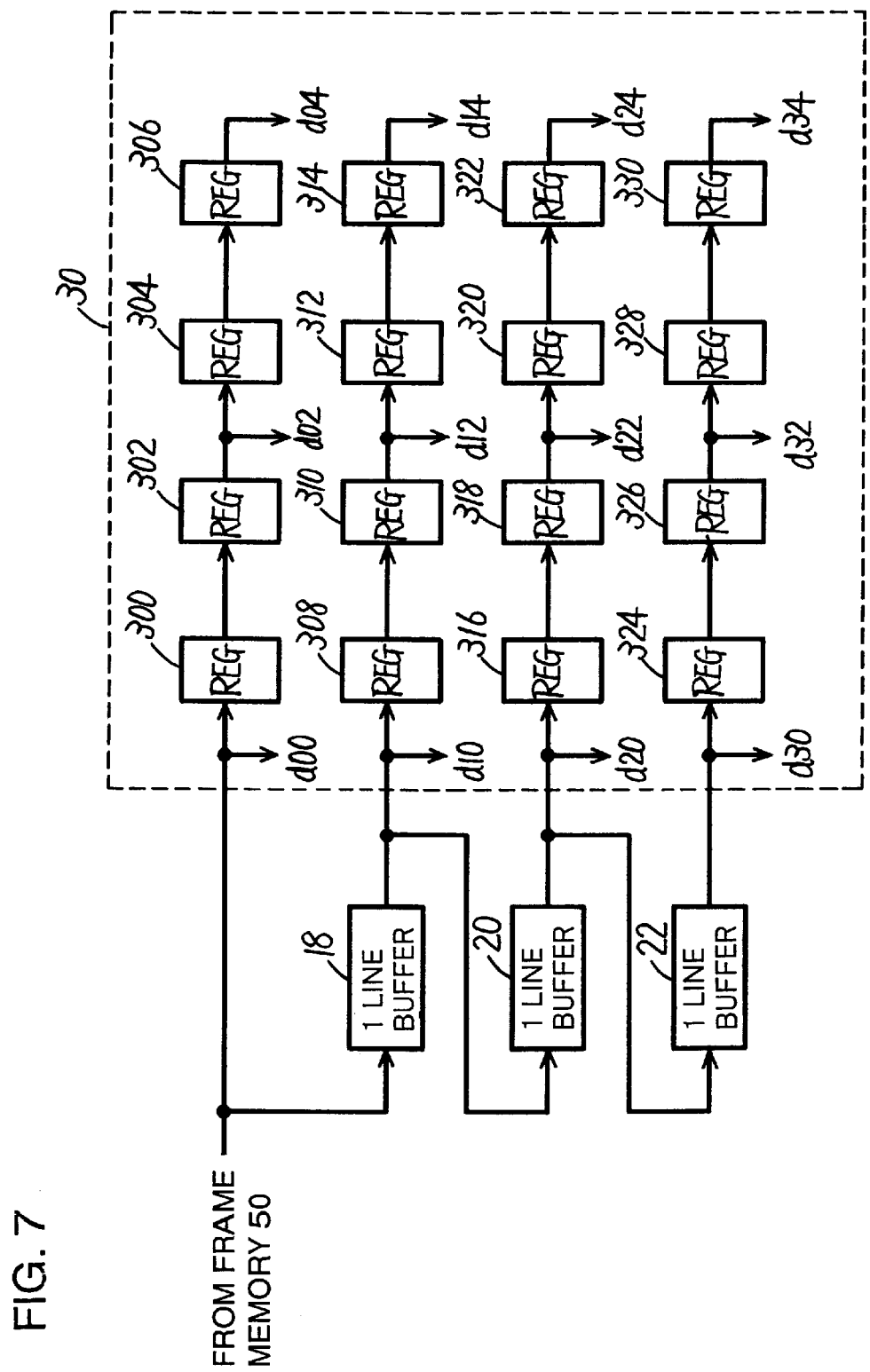
FIG. 7 is a block diagram showing a structure of a two-dimensional register array 30 of a color signal processing system 1000 of FIG. 1.

FIG. 7 shows in further detail the structure of scanning line delay circuits 18, 20 and 22 receiving the signal read out from CCD 10 and two-dimensional register array 30.

Two-dimensional register array 30 includes a register 300 receiving a signal d00 output from frame memory 50 in which the signal output from A/D converter 48 is retained to output a signal delayed for one clock, a register 302 receiving and delaying for one clock the signal from register 300 to output a signal d02, a register 304 receiving and delaying signal d02 for one clock to output a signal, and a register 306 receiving and delaying the output of register 304 for one clock to output a signal d04.

Two-dimensional array register 30 further includes a register 308 receiving and delaying for one clock a signal d10 from scanning line delay device 18, a register 310 receiving and delaying for one clock the output from register 308 to output a signal d12, a register 312 receiving signal d12 to output a signal delayed for 1 clock, a register 314 receiving and delaying for one clock the output of registers 312 to output a signal d14, a register 316 receiving a signal d20 from scanning line delay device 20 to output a signal delayed for 1 clock, a register 318 receiving and delaying for 1 clock the output of register 316 to output a signal d22, a register 320 receiving signal d22 to output a signal delayed for 1 clock, a register 322 receiving and delaying for 1 clock the output of register 320 to output a signal d24, a register 324 receiving a signal d30 from scanning line delay device 22 to output a signal delayed for 1 clock, a register 326 receiving and delaying for 1 clock the output of register 324 to output a signal d32, a register 328 receiving signal d32 to output a signal delayed for 1 clock, and a register 330 receiving and delaying for 1 clock the output of register 328 to output a signal d34.

By two-dimensional register array 30, the signals read out serially from CCD 10 are converted so that the signals from the photoelectric conversion elements corresponding to the pixels of 4 rows and 5 columns are respectively output in parallel.

The above signals d00–d34 correspond to the signal output from the photoelectric conversion element corresponding to pixels (x, y) in CCD 10, represented by character dxy.

In order to compute respective magenta, green, cyan and yellow color signals at the center position of the pixel group of 4 rows and 6 columns, signals from the pixels of 4 rows and 5 columns in the pixel group of 4 rows and 6 columns are to be used, as apparent from FIGS. 3–6. Therefore, the two-dimensional register array can be formed of registers 300–330 of 4 rows and 4 columns as shown in FIG. 7, not registers of 4 rows and 6 columns.

Figure 8:
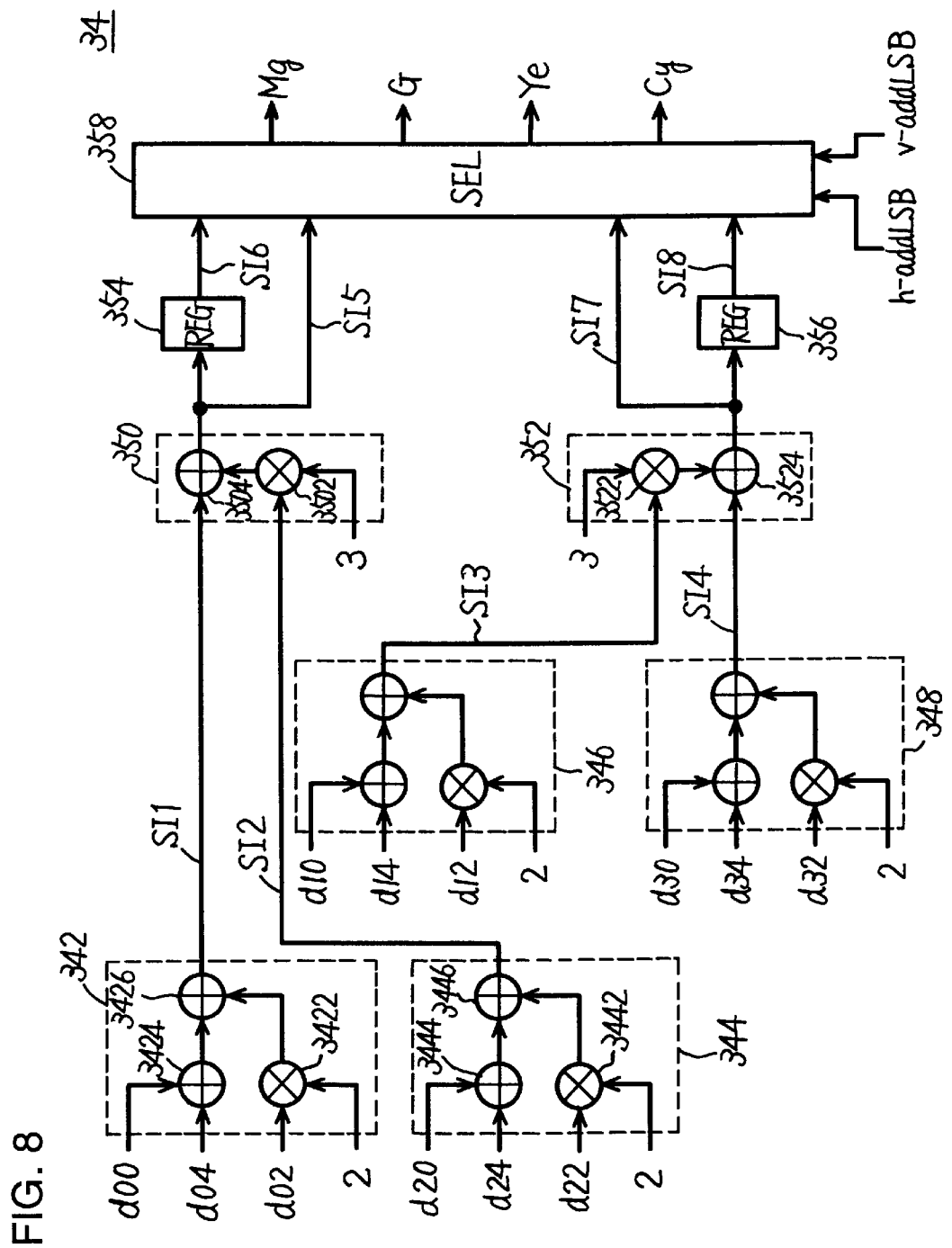
FIG. 8 is a block diagram showing a structure of an interpolation processing circuit 34 of color signal processing system 1000 of FIG. 1.

Referring to FIG. 8, interpolation processing circuit 34 includes an interpolation operation unit 342 receiving signals d00, d02 and d04 to output a first interpolation signal SI1, an interpolation operation unit 344 receiving signals d20, d22 and d24 to output a second interpolation signal SI2, an interpolation operation unit 346 receiving signals d10, d12 and d14 to output a third interpolation signal SI3, an interpolation operation unit 348 receiving signals d30, d32 and d34 to output a fourth interpolation signal SI4, an interpolation operation unit 350 receiving signals SI1 and SI2 to output a fifth interpolation signal SI5, a register 354 receiving signal SI5 and delaying for 1 clock to output a sixth interpolation signal SI6, an interpolation operation unit 352 receiving signals SI3 an SI4 to output a seventh interpolation signal SI7, a register 356 receiving signal SI7 and delaying for 1 clock to output an eighth interpolation signal SI8, and a select circuit 358 under control of circuit 42 to output respective fifth to eighth interpolation signals as a green color signal G, a cyan color signal Cy, a magenta color signal Mg and a yellow color signal Ye.

Interpolation operation unit 342 includes a multiplier 3422 receiving signal d02 to double the intensity thereof for output, an adder 3424 providing an added result of signal d00 and signal d04, and an adder 3426 providing the added result of adder 3424 and multiplier 3422 as first interpolation signal SI1. The structure of interpolation operation units 344, 346 and 348 is basically similar to that of interpolation operations unit 342, provided that the received signal differs.

Interpolation operation unit 350 includes a multiplier 3502 that receives signal SI2 to output a signal threefold in intensity, and an adder 3504 providing the added result of the output of multiplier 3502 and signal SI1 as signal SI5.

Interpolation operation unit 352 includes a multiplier 3522 receiving signal SI3 to output a signal threefold in intensity, and an adder 3524 providing an added result of the output of multiplier 3522 and signal SI4 as signal SI7.

Figure 2:
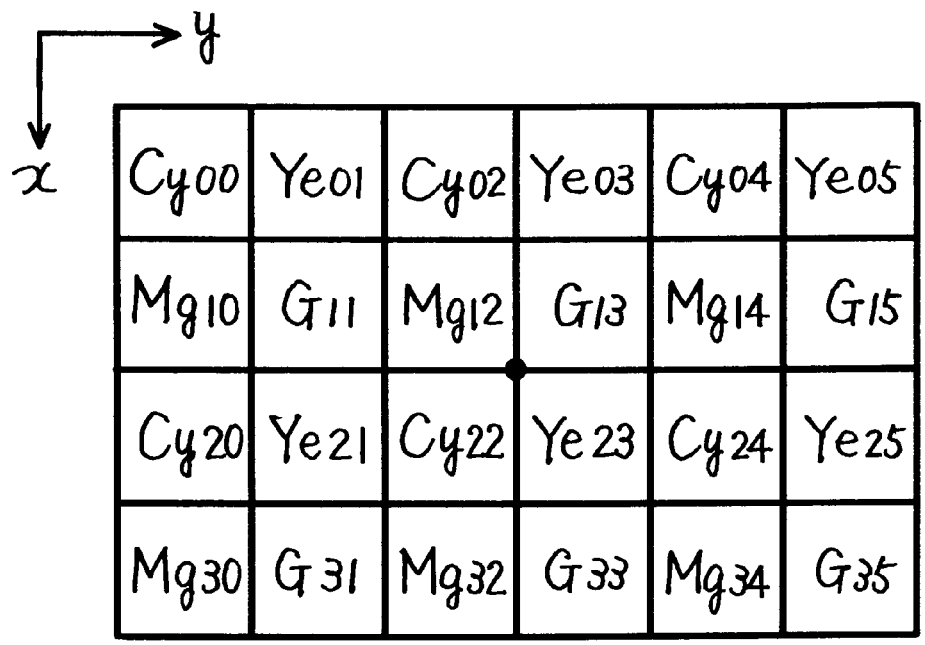
FIG. 2 is a schematic diagram showing an arrangement of a color filter array of the first embodiment.
Figure 6:
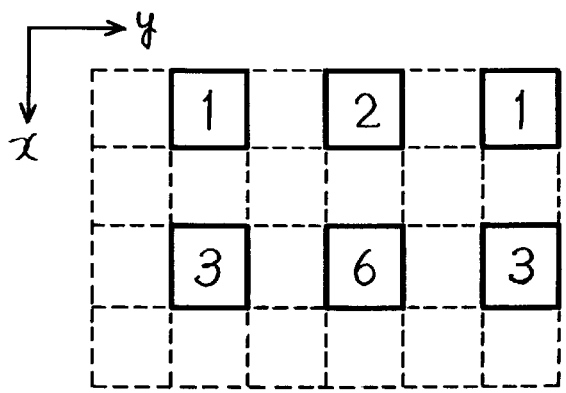

When the arrangement of the color filters corresponds to that shown in FIG. 2, interpolation operation unit 350 carries out a weighted mean process according to the arrangement of the weighting coefficients shown in FIG. 6 at the first clock timing. The result of the interpolation operation is retained in register 354 and applied to select circuit 358 as signal SI6.

Figure 5:
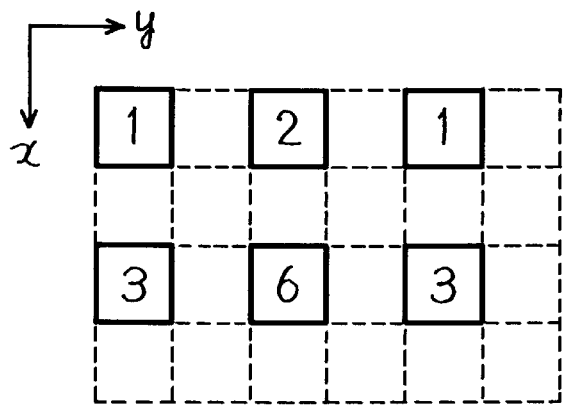

At the second clock timing following the first clock timing, interpolation operation unit 350 carries out a weighted mean process according to the arrangement of the weighting coefficients shown in FIG. 5. The result of this interpolation operation is applied to select circuit 358 as signal SI5.

Figure 4:
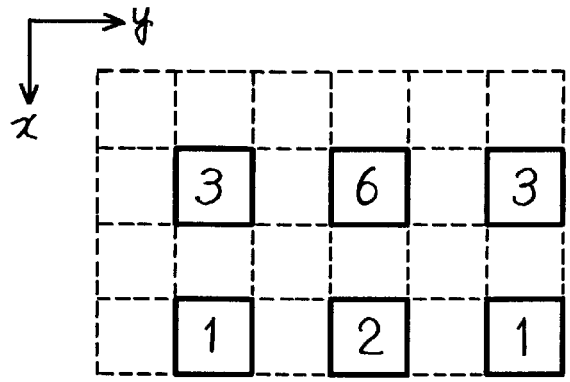

Similarly, when the arrangement of the color filter corresponds to that shown in FIG. 2, interpolation operation unit 352 carries out a weighted mean process according to the arrangement of the weighting coefficients shown in FIG. 4. The result of this interpolation operation is retained in register 356 and applied to select circuit 358 as signal SI8.

Figure 3:
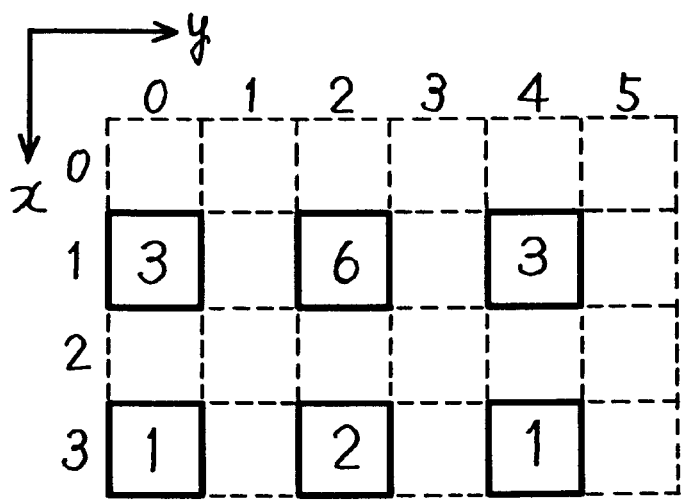
FIGS. 3, 4, 5 and 6 show the arrangement of weighting coefficients in an interpolation process for an arrangement of a magenta color filter, a green color filter, a cyan color filter, and a yellow color filter, respectively, of FIG. 3.

At the second clock timing, interpolation operation unit 352 carries out a weighted mean process according to the arrangement of the weighting coefficients shown in FIG. 3. The result of this interpolation operation is applied to select circuit 358 as signal SI7.

Select circuit 358 switches the correspondence between the fifth to eighth interpolation signals SI5–SI8 and the color signals of green G, cyan Cy, magenta Mg and yellow Ye according to the least significant bit h-addLSB of horizontal address HA and the least significant bit v-addLSB of vertical address VA indicating the current readout position from CCD 10 output from control circuit 42.

For example, when the arrangement of the color filters corresponds to that of FIG. 2, the fifth interpolation signal SI5, the sixth interpolation signal SI6, the seventh interpolation signal SI7, and the eighth interpolation signal SI8 correspond to cyan color signal Cy, yellow color signal Ye, magenta color signal Mg and green color signal G, respectively. Therefore, select circuit 358 outputs a signal according to such correspondence.

When the arrangement of color filters corresponding to the pixels of 4 rows and 6 columns from which a signal is read out changes, the above correspondence is altered by select circuit 358 accordingly.

By a predetermined weighted mean process on a signal read out from the photoelectric conversion elements corresponding to the pixels of 4 rows and 6 columns for each of green color signal G, cyan color signal Cy, magenta color signal Mg and yellow color signal Ye according to the operation of interpolation processing circuit 34, a signal corresponding to the center position of the pixels of 4 rows and 6 columns is generated.

Figure 9:
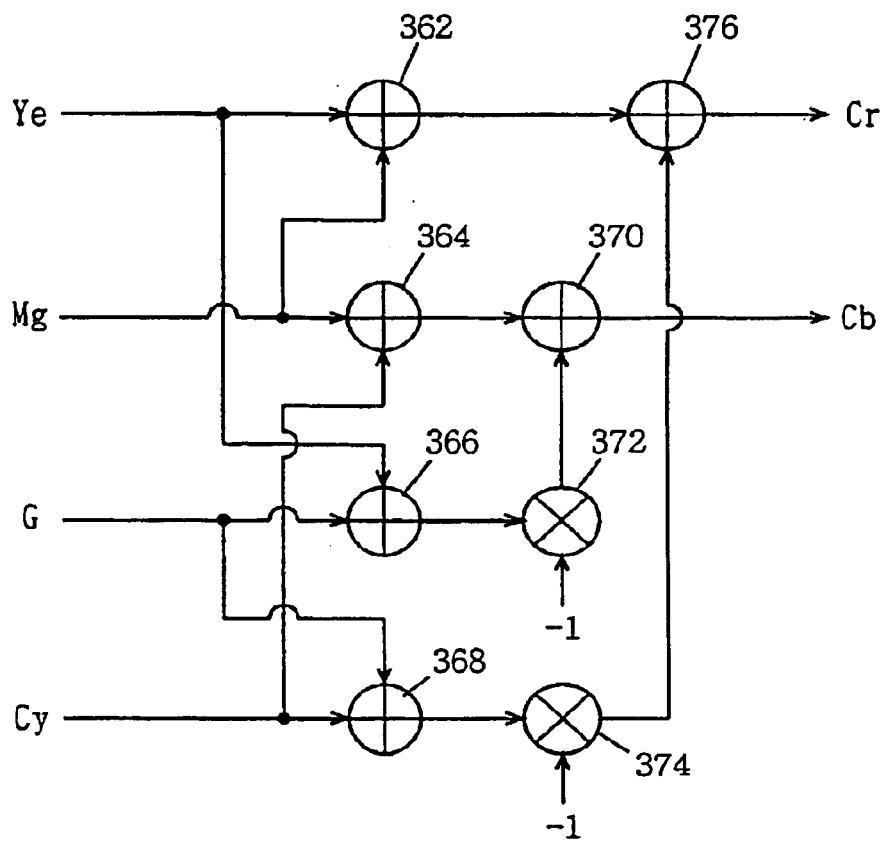
FIG. 9 is a block diagram showing a structure of a color separation circuit 36 of color signal processing system 1000 of FIG. 1.

FIG. 9 is a block diagram showing in further detail the structure of color difference signal generation circuit 36 of FIG. 1.

Referring to FIG. 9, color difference signal generation circuit 36 includes an adder 362 receiving and adding yellow color signal Ye and magenta color signal Mg, an adder 368 receiving and adding green signal G and cyan signal Cy, a multiplier 374 multiplying the output of adder 368 by −1, and an adder 376 adding the output of adder 362 and the output of multiplier 374 to output a signal Cr.

Color difference signal generation circuit 36 further includes an adder 364 receiving and adding magenta color signal Mg and cyan color signal Cy, adder 366 receiving and adding green color signal G and yellow color signal Ye, a multiplier 372 multiplying the output of adder 366 by−1, and an adder 370 adding the output of adder 364 and the output of multiplier 372 to output a signal Cb.

By the operation set forth in the following, color difference signal generation circuit 36 generates color difference signals Cb and Cr from green color signal G, cyan color signal Cy, magenta color signal Mg and yellow color signal Ye.

$$Cb = (Cy + Mg) - (Ye + G) \quad (21)$$
$$= (R + G + 2B) - (R + 2G) = 2B - G$$

$$Cr = (Ye + Mg) - (G + Cy) \quad (22)$$
$$= (2R + G + B) - (B + 2G) = 2R - G$$

A weighted mean process according to the weighting coefficients shown in FIGS. 3–6 corresponds to a filtering process by a low-pass filter for the row direction and the column direction, as will be described afterwards. By generating color difference signals on the basis of such generated signals G, Mg, Ye and Cy, generation of a pseudo color can be suppressed.

[Generation of Luminance Signal]

A luminance signal can be generated by the operation set forth in the following from green color signal G, cyan color signal Cy, magenta color signal Mg and yellow color signal Ye obtained by the above interpolation process.

$$Y = (Cy + Mg) + (Ye + G) \quad (23)$$
$$= (R + G + 2B) + -(R + 2G) = 2R + 3G + 2B$$

Alternatively, a luminance signal can be generated by computation according to the above equation directly from the signals corresponding to the pixels of 2 rows and 2 columns surrounding the center position out of the signals from the photoelectric conversion elements corresponding to the pixels of 4 rows and 4 columns.

Although generation of a pseudo color can be suppressed by the interpolation process, the resolution will be degraded by the interpolation. Since the eye of a person is highly sensitive to luminance information than color information, reduction in the resolution perceived by the human being can be suppressed by directly using a signal not subjected to an interpolation process for luminance signal Y.

Figure 10:
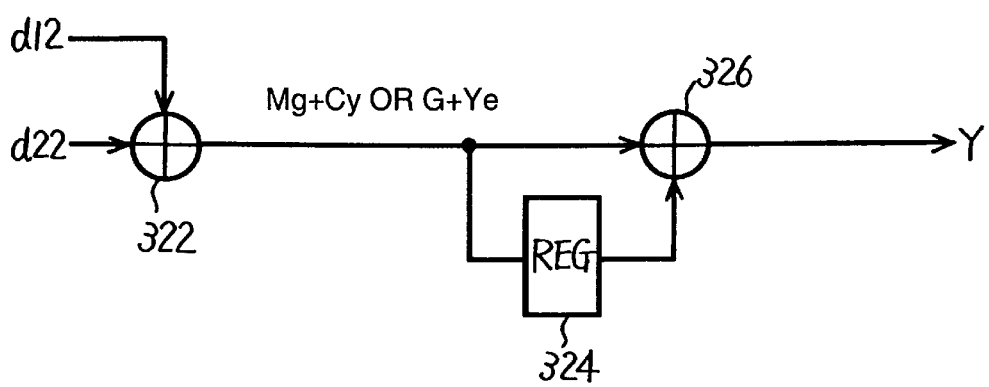
FIG. 10 is a schematic block diagram for describing a structure of a luminance signal generation circuit 32.

FIG. 10 is a schematic block diagram showing a structure of a luminance signal generation circuit 32 to generate such a luminance signal Y.

Luminance signal generation circuit 32 includes an adder 322 adding signals d12 and d22, a register 324 receiving and retaining the output of adder 322, and an adder 326 receiving the output from adder 322 and register 324 to output the added result as luminance signal Y.

For example, when the arrangement of the color filter corresponds to that shown in FIG. 2, the added result between signals G13 and Y23 is output from adder 322 at the first clock timing to be retained in register 324.

Then, at the second clock timing subsequent to the first clock timing, an added result of signals Mg12 and Cy22 is output from adder 322. Therefore, a luminance signal represented by the following equation (24) is output from adder 326 at the second clock timing.

$Y = G13 + Ye23 + Mg12 + Cy22$ (24)

According to the above structure, luminance signal Y is generated on the basis of signals from the photoelectric conversion elements corresponding to pixels of 2 rows and 2 columns surrounding the center position of the pixels of 4 rows and 6 columns. Therefore, reduction in resolution caused by interpolation can be suppressed.

Figure 11:
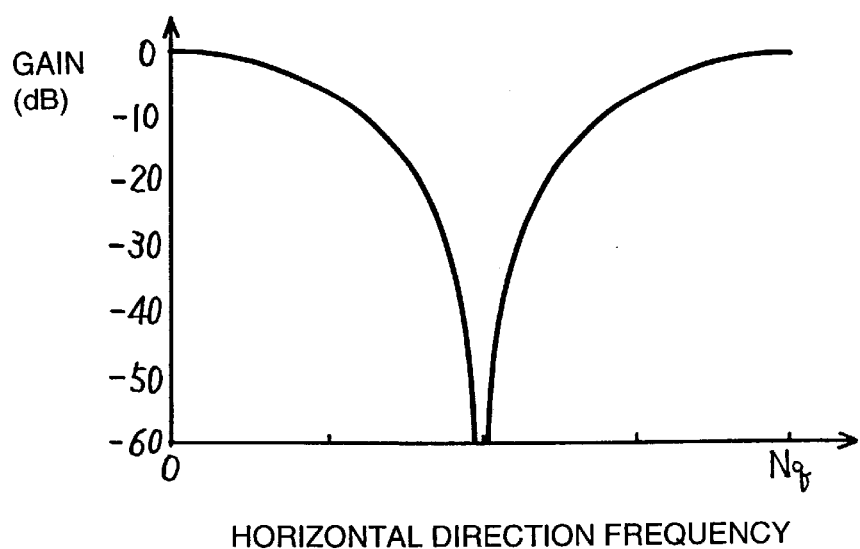
FIGS. 11 and 12 show the change in gain for the frequency in the horizontal direction and the vertical direction, respectively, in the interpolation process of the first embodiment.
Figure 12:
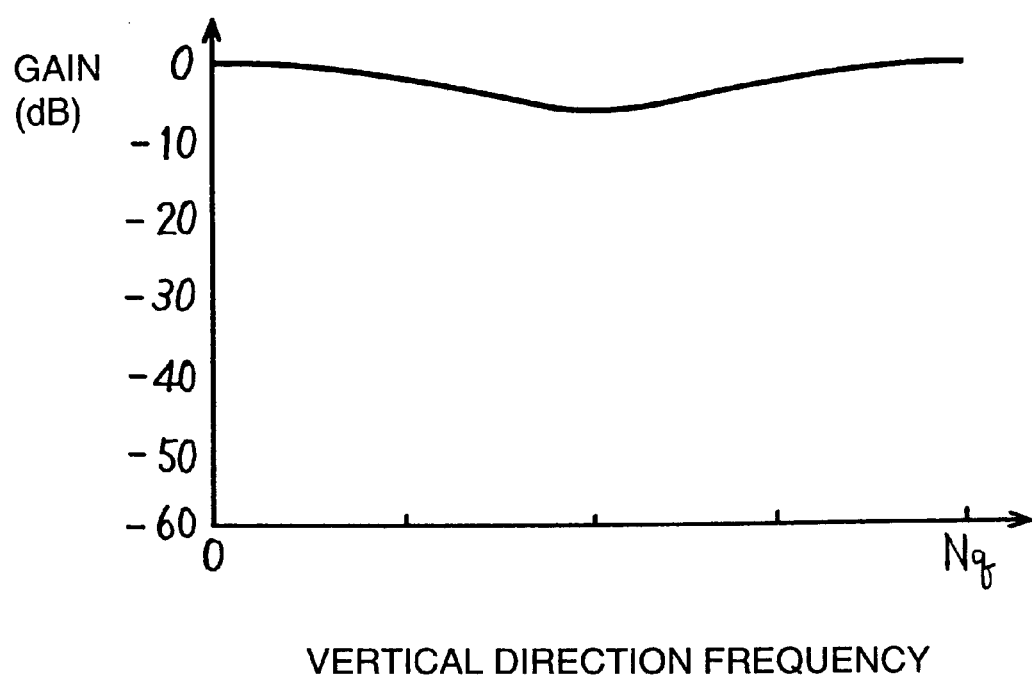
Figure 15:
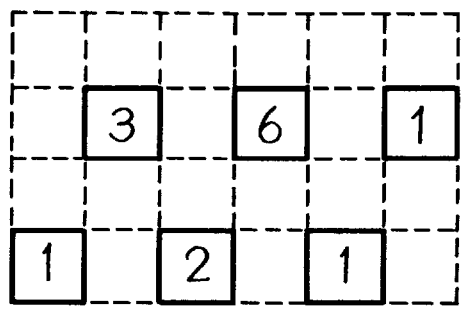
Figure 16:
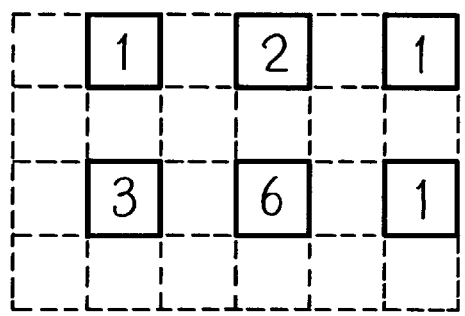
Figure 17:
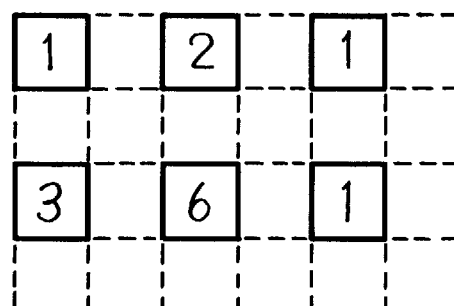
Figure 20:
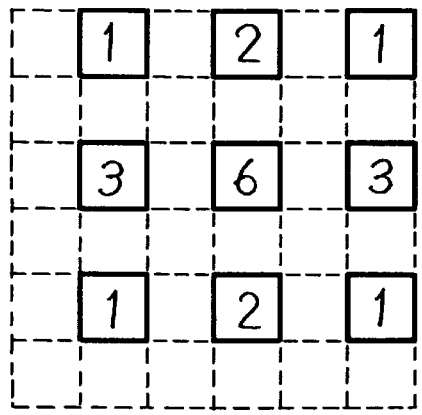
Figure 21:
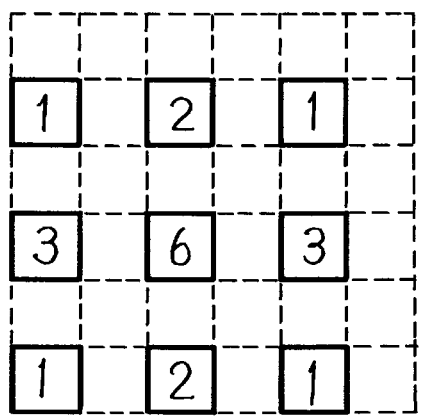
Figure 22:
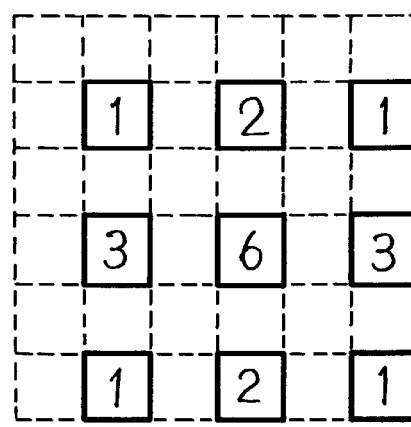

FIGS. 11 and 12 show the relationship of gain over the frequency in the horizontal direction and the vertical direction, respectively, when interpolation is carried out by a digital filter with the weighting coefficients shown in FIG. 4.

The spatial frequency corresponding to the pixel is plotted along the abscissa, and the gain represented in decibel (dB) is plotted along the ordinate.

Here, frequency Nq along the horizontal axis represents the Nyquist frequency.

The frequency dependence of both gains shows the characteristics as a low-pass filter. By generating color difference signals according to signals G, Mg, Ye, Cy according to a filter process of such characteristics, generation of a pseudo color can be suppressed.

The present invention is not limited to the green color signal, cyan color signal, magenta color signal and yellow color signal. The present invention is applicable to a combination of other color signals such as a combination of YM, CG, YG, and CM used in the color filters of the frame color difference sequential system.

Furthermore, the present invention is not limited to the arrangement of color filters for a green color filter and three complementary color filters in the color difference sequential system.

Second Embodiment

The previous first embodiment corresponds to the case where the arrangement of the color filter array is as shown in FIG. 2.

The arrangement of the color filter array based on the signals of G, Mg, Ye, and Cy includes the method of arrangement as shown in FIG. 13, in addition to the arrangement of FIG. 2.

In the color filter arrangement of FIG. 2, the magenta color filter and the green color filter of the row of x=2 and the row of x=4 have the same arrangement in the y direction.

In the arrangement of FIG. 13, the magenta color filter and the green color filter are arranged shifted by one pixel in the y direction for the row of x=2 and the row of x=4.

FIGS. 14–17 show the arrangement of the weighting coefficients in the interpolation process for the arrangement of the magenta color filter, the green color filter, the cyan color filter and the yellow color filter, respectively, of FIG. 13.

The two-dimensional register array shown in FIG. 7 of the first embodiment is now implemented in 4 rows and 5 columns in the present second embodiment. Accordingly, interpolation according to such weighting coefficients can be carried out by modifying the structure of the interpolation processing circuit shown in FIG. 8 for the first embodiment.

In the second embodiment, the process corresponds to a filter process of a low-pass filter for at least the horizontal direction (y direction). Therefore, occurrence of a pseudo color can be suppressed by generating color difference signals from signals G, Mg, Ye, and Cy by the filter process.

Third Embodiment

In the previous first embodiment, a pixel block of 4 rows and 6 columns is used as the pixel block for carrying out an interpolation process and generating a color signal corresponding to the center position.

The size of the pixel block is not limited to the structure of the first embodiment. A pixel block formed of a group of many more pixels can be employed.

FIG. 3 shows the usage of a pixel block of 6 rows and 6 columns as such a large pixel block.

FIG. 18 shows the arrangement of the color filter array corresponding to such a pixel block of 6 rows and 6 columns.

FIGS. 19, 20, 21, and 22 show the arrangement of weighting coefficients in an interpolation process for the arrangement of a magenta color filter, a green color filter, a cyan color filter and a yellow color filter, respectively of FIG. 18.

Figure 23:
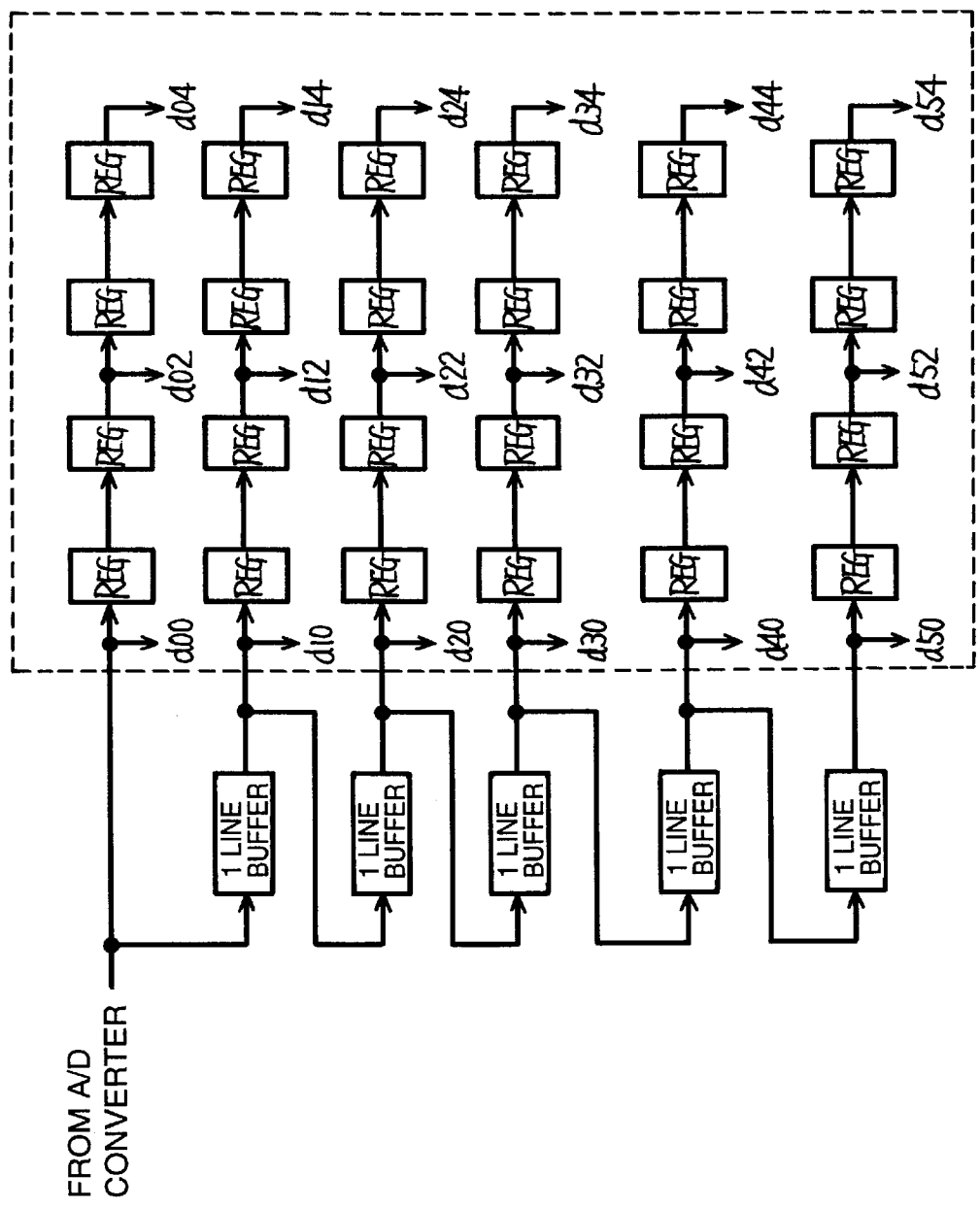
FIG. 23 is a block diagram showing a structure of a two-dimensional register array 31 according to a third embodiment of the present invention.
Figure 24:
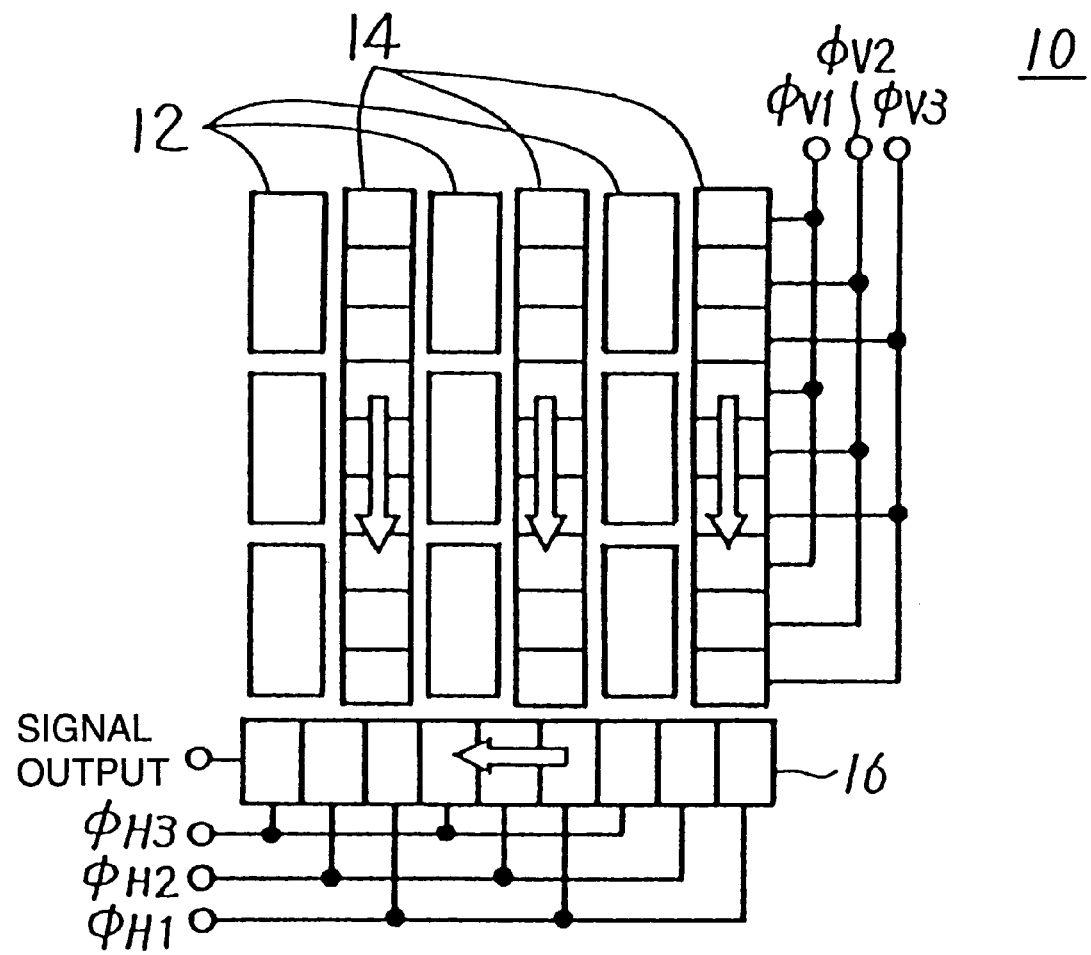
FIG. 24 is a schematic block diagram showing a structure of a CCD 10.
Figure 25:
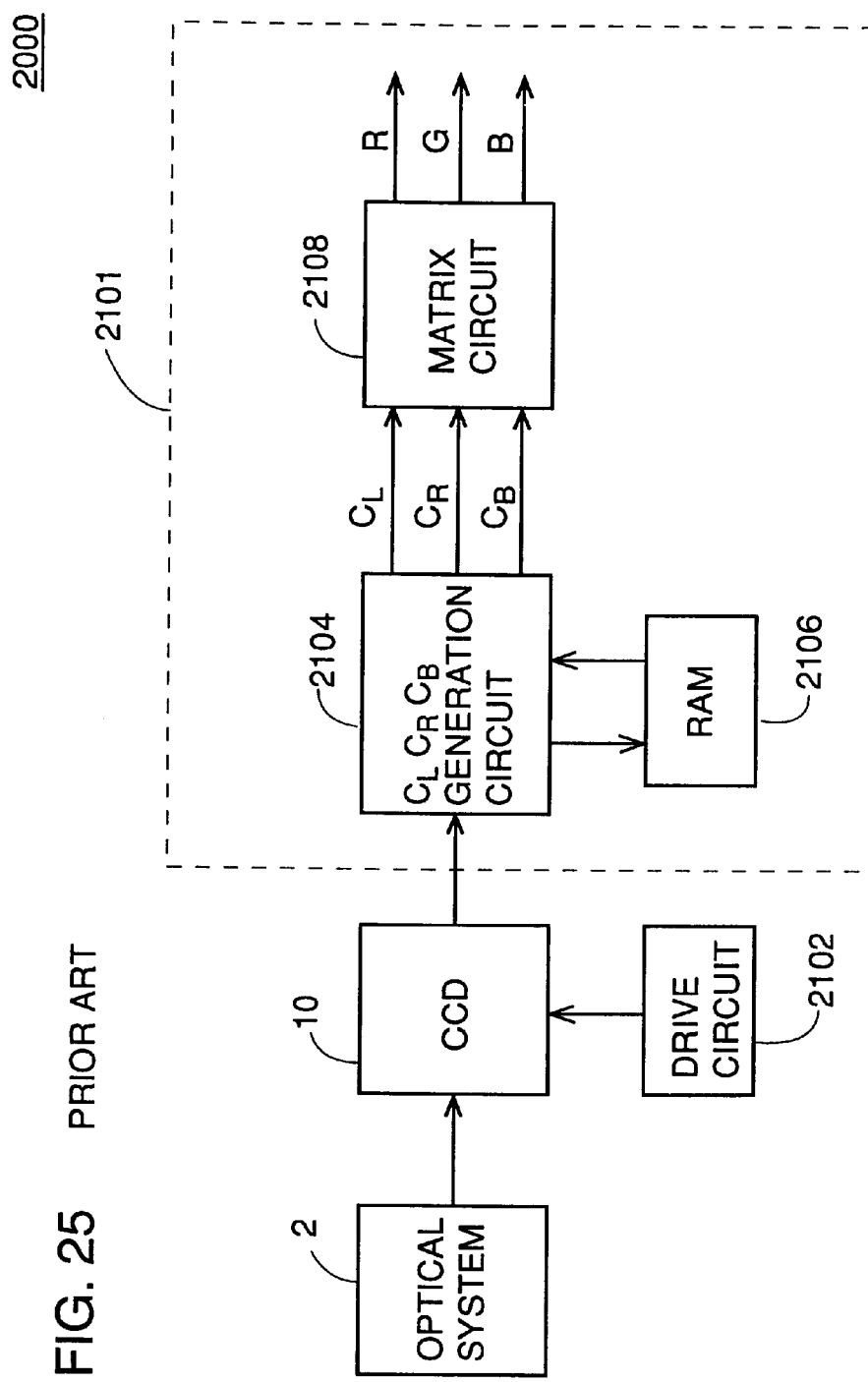
FIG. 25 is a schematic block diagram showing a structure of a conventional one-chip color camera 2000.
Figure 26:
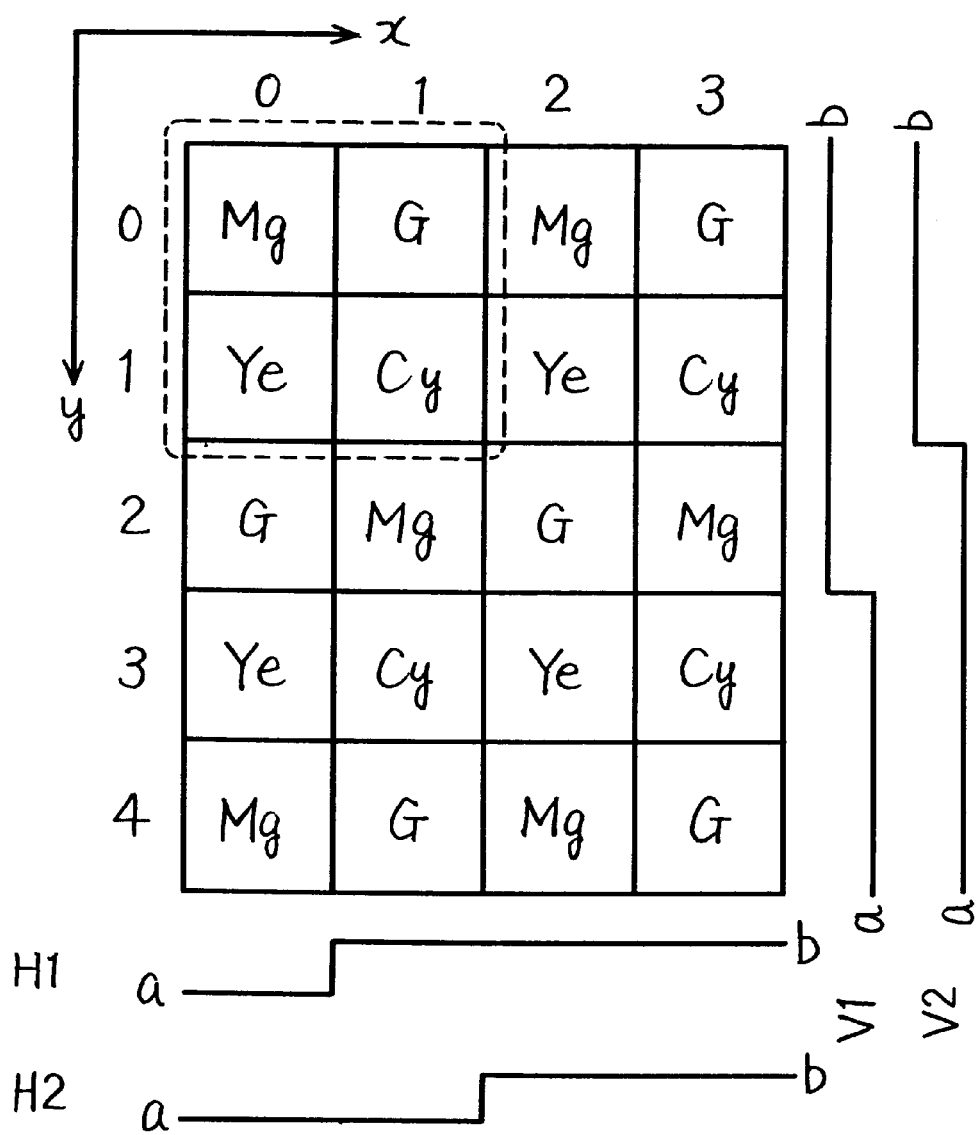
FIG. 26 is a schematic diagram for describing an arrangement of a color filter array and an operation of reading out entire pixels independently.

FIG. 23 is a schematic block diagram showing a structure of a two-dimensional register array of the third embodiment.

The two-dimensional register array of the third embodiment differs from the two-dimensional register array of the first embodiment shown in FIG. 7 in that the registers are arranged in 6 rows and 4 columns.

Accordingly, interpolation using such weighting coefficient can be carried out by modifying the structure of the interpolation processing circuit of the first embodiment shown in FIG. 8.

The process corresponds to a filter process of a low pass filter for the horizontal direction (y direction) and the vertical direction (x direction). Therefore, generation of a pseudo color can be suppressed by generating color difference signals on the basis of signals G, Mg, Ye, and Cy by such a filter process, similar to the first embodiment.

The present invention is not limited to the above embodiments in which interpolation is carried out by a weighted mean process of weighting coefficients arranged corresponding to color filters of 4 rows and 6 columns or 6 rows and 6 columns. For example, the pixels subjected to interpolation can be pixels of (2×m) rows and (2×n) columns, where m and n are natural numbers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital color camera comprising:
    a solid state image sensing circuit in which a photoelectric conversion element corresponding to each pixel is arranged in an array, wherein said image sensing circuit has multiple such photoelectric conversion elements and comprises:
        a color filter array including a plurality of rectangular filter array subsets in each of which a green filter and first to third complementary color filters are arranged, corresponding to said photoelectric conversion elements, in a mosaic arrangement in a (2×m)-row by (2×n)-column matrix (m and n being natural numbers with n being larger than m) with ones of the color filters being associated with outputs of corresponding ones of the photoelectric conversion elements; and
    a color separation circuit, responsive to an output of said image sensing circuit, that generates color data corresponding to a center position in the (2×m)-row by (2×n)-column matrix, wherein the color separation circuit comprises:
        a color interpolation circuit, operative in response to outputs from a plurality of the photoelectric conversion elements that correspond to the (2×m)-row by (2×n)-column matrix of said each filter array subset, that implements a low-pass filter process in at least one of a column direction and a row direction for each color of green and the first, second and third complementary colors, on outputs from those ones of the plurality of photoelectric conversion elements corresponding to one of the green filter and the first to third complementary color filters; and a separation operation circuit that receives outputs from said color interpolation circuit to separate color data therefrom corresponding to said center position.

2. The digital color camera according to claim 1 wherein:

said color filter array comprises m first rows and m second rows arranged alternately for each row corresponding to said group of pixels of (2×m) rows and (2×n) columns;

each of said first rows having a green color filter and a first complementary color filter arranged alternately; and each of said second rows having a second complementary color filter and a third complementary color filter arranged alternately.

3. The digital color camera according to claim 2 wherein m and n have a value of 2 and 3, respectively.

4. The digital color camera according to claim 3 wherein said color separation circuit comprises a luminance signal operation circuit that provides a luminance signal by adding outputs from those of said photoelectric conversion elements in a 2-row by 2-column matrix surrounding said center position out of outputs of said photoelectric conversion elements corresponding to said pixels in a 4-row by 6-column matrix.

5. The digital color camera according to claim 3 wherein:

said first to third complementary colors are magenta, yellow and cyan, respectively;

said color interpolation circuit comprises a digital filtering circuit that implements said low-pass filter process; and said digital filtering circuit selects and executes according to an arrangement of color filters corresponding to said pixels of 4 rows and 6 columns any of a first weighted mean process of w (1, 0)=3, w (3, 0)=1, w (1, 2)=6, w (3, 2)=2, w (1, 4)=3, w (3, 4)=1, a second weighted mean process of w (1, 1)=3, w (3, 1)=1, w (1, 3)=6, w (3, 3)=2, w (1, 5)=3, w (3, 5)=1, a third weighted mean process of w (0, 0)=1, w (2, 0)=3, w (0, 2)=2, w (2, 2)=6, w (0, 4)=1, w (2, 4)=3 and a fourth weighted mean process of w (0, 1)=1, w (2, 1)=3, w (0, 3)=2, w (2, 3)=6, w=(0, 5)=1, w (2, 5)=3, where the output from the photoelectric conversion element corresponding to said pixels of 4 rows and 6 columns is D (x, y) (x=0–5, y=0–3), and a weighting coefficient corresponding to said D (x, y) is w (x, y).

6. The digital color camera according to claim 5 further comprising:

a frame memory that receives and retains a signal of 1 image from said image sensing circuit; and a conversion circuit that receives a signal sequentially read out for each row from said frame memory so as to define a received signal and converts the received signal into parallel data for every 4 rows;

wherein said digital filtering circuit comprises:

a register array of 4 rows and 4 columns that receives an output from said conversion circuit to delay each pixel data; and an interpolation processing circuit that receives an output of the register array to select and execute any of said first to fourth weighted mean processes according to arrangement of color filters corresponding to said pixels of 4 rows and 6 columns.

7. The digital color camera according to claim 5 wherein said color separation circuit comprises a luminance signal operation circuit that provides a luminance signal by adding outputs from those of said photoelectric conversion elements in a 2-row by 2-column matrix surrounding said center position out of outputs of said photoelectric conversion elements corresponding to said pixels in a 4-row by 6-column matrix.

8. A method of separating color data according to a signal read out from a solid state image sensing element with a color filter array, the array has a plurality of rectangular filter array subsets each of which having a green filter and first to third complementary color filters arranged, corresponding to photoelectric conversion elements, in a mosaic arrangement in a (2×m)-row by (2×n)-column matrix (m and n being natural numbers with n being larger than m) with ones of the color filters being associated with outputs of corresponding ones of the photoelectric conversion elements, each of said first rows having a green color filter and a first complementary color filter arranged alternately and each said second rows having a second complementary color filter and a third complementary color filter arranged alternately, said method comprising the steps of:

performing, in response to outputs from a plurality of the photoelectric conversion elements that correspond to the (2×m)-row by (2×n)-column matrix, a low-pass filter process in at least one of a column direction and a row direction for each color of green and the first, second and third complementary colors, on outputs from those ones of the plurality of photoelectric conversion elements corresponding to one of the green filter and the first to third complementary color filters; and receiving a signal resulting from said low-pass filter process and separating color data therefrom corresponding to a center position of photoelectric conversion elements of said (2×m) rows and (2×n) columns.

9. The method according to claim 8 wherein m and n have a value of 2, and 3, respectively.

10. The method according to claim 9 wherein said first to third complementary colors are magenta, yellow and cyan, respectively; and said performing step comprises the step of selecting and executing any of first to fourth weighted mean processes according to arrangement of color filters corresponding to pixels of said 4 rows and 6 columns where an output from a photoelectric conversion element corresponding to pixels of said 4 tows and 6 columns is D (x, y) (x=0–5), y=0–3), and a weighting coefficient corresponding to said D (x, y) is w (x, y), wherein:

w (1, 0)=3, w (3, 0)=1, w (1, 2)=6, w (3, 2)=2, w (1, 4)=3, w (3, 4)=1 in said first weighted means process, w (1, 1)=3, w (3, 1)=1, w (1, 3)=6, w (3, 3)=2, w (1, 5)=3, w (3, 5)=1 in said second weighted mean process, w (0, 0)=1, w (2, 0)=3, w (0, 2)=2, w (2, 2)=6, w (0, 4)=1, w (2, 4)=3 in said third weighted mean process, and w (0, 1)=1, w (2, 1)=3, w (0, 3)=2, w (2, 3)=6, w=(0, 5)=1, w (2, 5)=3 in said fourth weighted mean process.

* * * * *